(12) United States Patent
Corn et al.

(10) Patent No.: US 9,042,713 B2
(45) Date of Patent: May 26, 2015

(54) SYSTEM AND METHOD FOR STORING IMAGES CAPTURED FROM A BOOTH

(75) Inventors: Steven Corn, Staten Island, NY (US); Jeremy Radino, Bellport, NY (US)

(73) Assignee: SUPER BOOTHS INC., Ronkonkoma, NY (US)

( * ) Notice: Subject to any disclaimer, the term of this patent is extended or adjusted under 35 U.S.C. 154(b) by 326 days.

(21) Appl. No.: 13/295,584

(22) Filed: Nov. 14, 2011

(65) Prior Publication Data

US 2012/0120257 A1    May 17, 2012

Related U.S. Application Data

(60) Provisional application No. 61/413,437, filed on Nov. 13, 2010.

(51) Int. Cl.
*G03B 15/00*    (2006.01)
*H04N 5/225*    (2006.01)
*H04N 1/00*    (2006.01)

(52) U.S. Cl.
CPC ....... *H04N 1/00161* (2013.01); *H04N 1/00132* (2013.01); *H04N 1/00137* (2013.01); *H04N 1/00167* (2013.01); *H04N 1/00172* (2013.01); *H04N 1/00183* (2013.01); *H04N 1/00196* (2013.01)

(58) Field of Classification Search
None
See application file for complete search history.

(56) References Cited

U.S. PATENT DOCUMENTS

| 6,718,123 B1* | 4/2004 | Massarsky | 386/200 |
| 2005/0171906 A1* | 8/2005 | Sean Shek et al. | 705/41 |
| 2010/0296801 A1* | 11/2010 | Lane | 396/2 |
| 2011/0145073 A1* | 6/2011 | Richman et al. | 705/14.66 |
| 2011/0234779 A1* | 9/2011 | Weisberg | 348/61 |

* cited by examiner

*Primary Examiner* — Lin Ye
*Assistant Examiner* — John H Morehead, III
(74) *Attorney, Agent, or Firm* — Seth H. Ostrow, Esq.; Meister Seelig & Fein LLP

(57) ABSTRACT

A system for capturing images in a booth. The system includes a network, a server communicatively coupled to the network, the server comprising a database operable to store images. The system further includes a booth communicatively coupled to the network, the booth comprising an input device operable to receive one or more inputs from a user, a camera operable to capture one or more images of the user, a display operable to present the one or more images, and a booth computer operable to transmit the one or more images to the server.

20 Claims, 4 Drawing Sheets

SYSTEM AND METHOD FOR STORING IMAGES CAPTURED FROM A BOOTH

CLAIM OF PRIORITY

The present application claims the benefit of U.S. Provisional Application Ser. No. 61/413,437, filed Nov. 13, 2010, which is hereby incorporated by reference herein in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention described herein generally relates to capturing image data in booths and transmission thereof to a web host.

BACKGROUND OF THE INVENTION

Conventionally, photo booths are kiosks or vending machines where users may enter and capture photographic images of themselves while in the booth.

One shortcoming of, these photo booths is that they fail to allow users to electronically capture and store the photographic images of themselves, and subsequently access or retrieve or forward their captured images on to family and friends or even save the images for posterity and use in the future. Users are left with only the images printed from the booths.

Another shortcoming of conventional photo booths is that they do not permit users to customize the captured images after their photographic session in the booth is over. Some of these booths may allow users to customize their photographic images prior to printing them in the booth. However, users may only customize their images while they are in the booth and cannot further customize or edit the images once they are printed.

Another shortcoming of conventional photo booths is that they are incapable of being customized by advertisers, companies and others, to complement and enhance the entertainment experience of the events in connection with which they are to be used.

Yet another shortcoming of conventional photo booths is that they are incapable of collecting and storing user data and information that may prove useful for further uses. Therefore, there exists a need for s a photo booth capable of providing its users with an entertainment experience that further enhances the event or experience in connection with which the photo booth is being used; capturing and storing unique images of its users during the entertainment experience provided by the photo booth; retrieving, manipulating, modifying, enhancing and customizing the images even after the users terminate their entertainment experience within the booth and any time thereafter; allowing its users to shares the modified images with others; capturing information about the users; and allowing for the customization of the photo booths so that they provide a unique experience for each and every event in connection with which they are being used.

SUMMARY OF THE INVENTION

The present invention provides a method and system for capturing image data in a booth. The method according to one embodiment of the invention includes receiving user information and transmitting the user information to a host server. The method further comprises customizing the photo booth for a particular event, permitting a user to customize the photo session to each user's desires in accordance with each user's preferences, desires and tastes, initiating a user photo session in the booth, encouraging user into various moods and poses to further enhance their entertainment experience within the photo booth, capturing image data of the user in the various poses struck as a result of the photo booth's encouragement, determining whether the photo session is complete, ending the photo session, transmitting the captured image together with the user data to a data management system and permitting the manipulation and use of such data for any future use.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration, exemplary embodiments in which the invention may be practiced. It is to be understood that other embodiments may be utilized and structural changes may be made without departing from the scope of the present invention.

Figure 1:
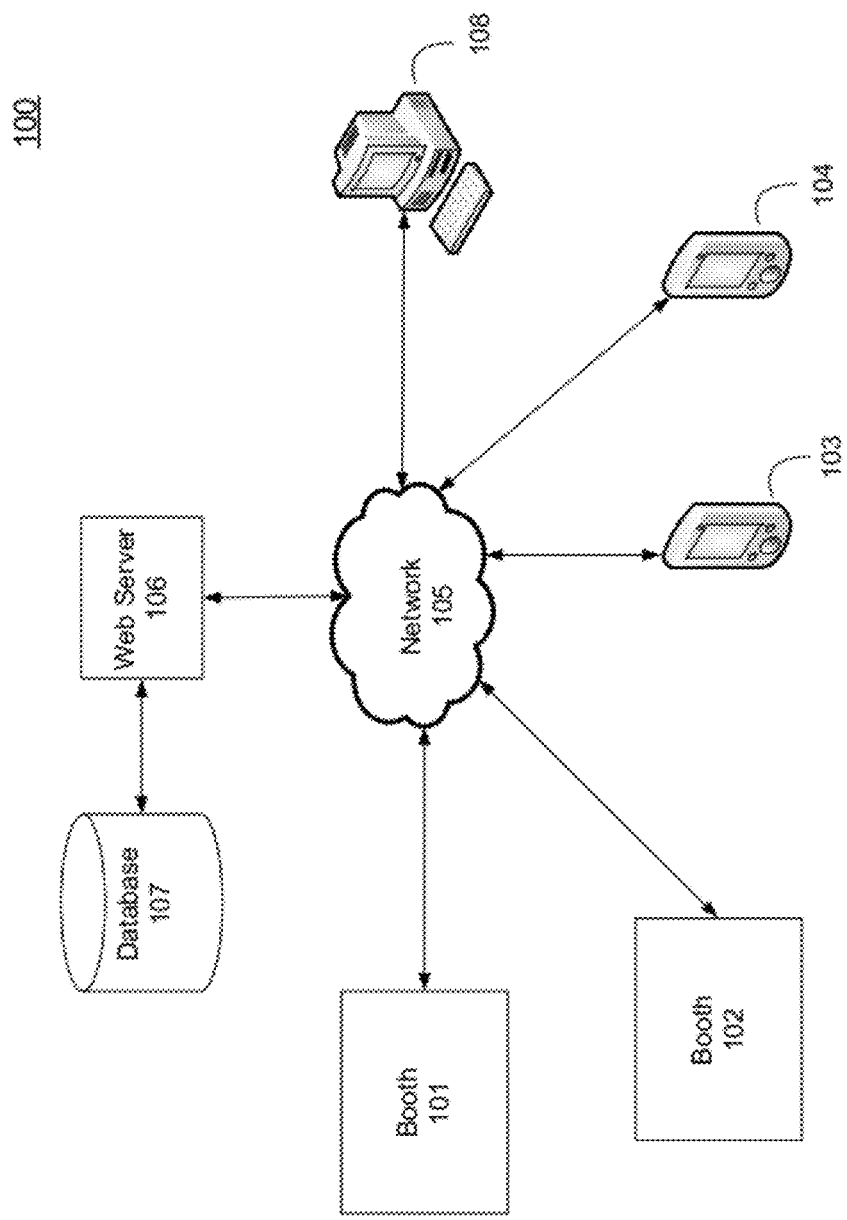
FIG. 1 illustrates an image capture system according to an embodiment of the present invention.

FIG. 1 illustrates one embodiment of a system 100 for storing captured images that includes booths 101, 102, mobile client computing devices 103, 104, network 105, web server 106, database 107 and client device 108.

Booths 101 and 102 may each include a kiosk comprising a display, one or more input devices and a camera. In some embodiments, booths 101 and 102 may include two or more display or touch screens. One or more user interfaces may be displayed on each screen in its entirety or a portion of the one or more user interfaces may be divided among the screens. Booths 101 and 102 are capable of capturing images of users and generating customizable photographs during photo sessions. Contents and functionality of the booths is described in further detail below.

Mobile client computing devices 103 and 104 may include a laptop, personal digital assistant (PDA), cell phone, tablet computer, or any mobile computing device capable of connecting to a network such as network 105. Network 105 may be any suitable type of network allowing data communications across thereof. In a typical embodiment, the network may be the Internet, following known Internet protocols for data communication, or any other communication network, e.g., any local area network (LAN), or wide area network (WAN) connection.

Web server 106 may comprise one or more processing components disposed on one or more processing devices or systems in a networked environment. Booths 101, 102 and mobile client computing devices 103, 104 may provide user information to booths 101 and 102 and to web server 106. Web server 106 may be coupled to database 107 for storing the user information provided to web server 106. Booths 101 and 102 may retrieve the stored user information stored in database 107 in real-time as "fresh" user information is received by web server 106 from various sources such as mobile client computing devices 103 and 104.

A photo session may be initiated in booths 101 or 102 to capture images of a user initiating the photo session in one of booths 101 and 102 entered by the user. In one embodiment, the captured images may be customized by the user in the entered booths 101 or 102. According to another embodiment, the user may also perform image customization using web server 106. Web server 106 can provide image editing and customization tools for customizing images received from booths 101 and 102. Customizing captured images may include adding backgrounds, effects, text, cropping, re-sizing, red-eye correction, color correction, and other photographic editing options known by one of ordinary skill in the art. Images captured during the photo session or the customized images may be transmitted to web server 106 and stored on database 107. Transmitted images may be stored with user information associated with the user participating in the photo session. In one embodiment, the user information and captured images may be hosted online by web server 106, where they may be accessed and customized. In one embodiment, the images, either the "raw" captured images, or customized may be stored for subsequent retrieval by the user in another booth or in any booth at a different time.

Client device 108 may include a desktop personal computer, workstation, terminal, or any computing device capable of connecting to a network. In one embodiment, mobile client computing devices 103, 104 and client device 108 may access user information and images transmitted from booths 101 and 102 via web server 106. Devices 103, 104, and 108 may be used by a user to find or identify a given booth location the user will be entering to initiate a photo session. For example, a user may select a given booth from a list of available booths or a nearest booth location may be identified for the user. Upon identifying the given booth, web server 106 may "preload" the identified booth with the user information before the user arrives at the booth (i.e., while the user is approaching the booth). In another embodiment of the present invention, web server 106 may also preload images transmitted from booths 101 and 102 from any previous photo sessions taken by the user associated with the user information. Web server 106 may host an online website for users to access and retrieve their information and images using any one of devices 103, 104, and 108. In one embodiment, web server 106 may connect to third party services such as web email, social networking sites, and content sharing services. For example, a user may select images captured in a photo session for delivery to the user's email contacts, instant messenger buddies, or to their social networking site (e.g., post on their "wall" in Facebook).

Figure 2:
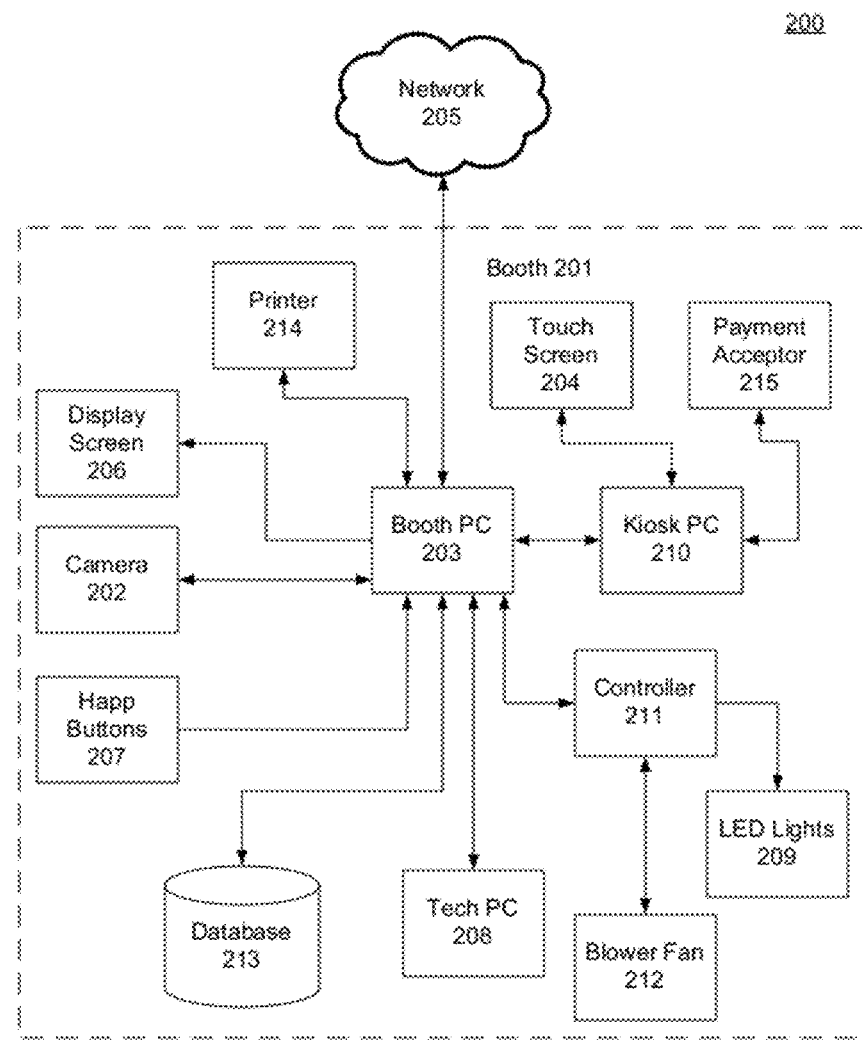
FIG. 2 illustrates an image capture system according to another embodiment of the present invention.

FIG. 2 describes in further detail one embodiment of an image capture system for capturing and transmitting images to web server 106 via network 205. FIG. 2 illustrates, in one embodiment, a booth 201 including a camera 202, booth personal computer (PC) 203, touch screen 204, display screen 206, happ buttons 207, tech PC 208, light-emitting diode (LED) lights 209, kiosk PC 210, controller 211, blower fan 212, database 213, printer 214, and payment acceptor 215. The components of booth 201 may be comprised of circuits, semiconductors, processors, and microchips.

Booth PC 203 controls and interfaces with the components in booth 201. User information and control commands may be entered into booth PC 203 via happ buttons 207 and touch screen 204. Booth PC 203 may also include photo capture and editing software. The photo capture and editing software may have various photo editing options and templates for enhancing captured images taken in the booth. According to an embodiment of the present invention, users can select virtual photographers for their photo sessions. Virtual photographers may include timed programs for capturing images in conjunction with at least one of videos, images, animations, graphics, and text that provide users in booth 201 with instructions or suggested actions, gestures, and poses users may perform while images are being captured in a photo session. For example, virtual photographers can walk users through a photo session and provide videos that customers can watch and follow along. Users may be given the option of selecting from a variety of virtual photographers, each with different templates, themes, instructions, poses, backgrounds, effects, etc.

In one embodiment, booth PC 203 may also include photo editing or finishing software for customizing images after they have been captured in a photo session. In another embodiment, templates, backgrounds, or other effects may be provided by web server 106 or from other third party services for photo editing or finishing. Photo editing or finishing may be performed in either booth 201 or via an online service where images captured in a photo session may later by retrieved. According to yet another embodiment, a user may edit the captured images using media items provided by the user. The media items may be provided by the user via a disk, a portable memory or media device, or downloaded from web server 106. Media items may be downloaded to booth PC 203 from web server 106 where the media items are received from devices 103, 104, and 108 prior to or during a photo session in booth 201.

Touch screen 204 may be connected to kiosk PC 210 and where kiosk PC 210 may be further connected to booth PC 203. Corresponding output from booth PC 203 and kiosk PC 210 may be generated in response to user inputs and displayed on display screen 206 and on touch screen 204. According to the embodiments of the present invention, one or more user interface may be displayed on display screen 206 and touch screen 204. For example, display screen 206 may display a preview of a photograph being taken, or that have been taken in a given photo session. Touch screen 204 may provide users in booth 201 a display of text, images, menus, and options. The touch screen 204 may also allow users to enter input via touch gestures, taps, and by providing an on-screen keyboard.

Booth PC 203 may store user information entered by users via kiosk PC 210 and touch screen 204 and images associated with the user information in database 213. In one embodiment, user information stored in database 213 may be transmitted to web server 106 via booth PC 203. User information may include a user's name, password, address, phone number, e-mail account, web service accounts, and user preferences. In an alternative embodiment, users may register and enter user information to web server 106 using devices 103, 104, and 108 from FIG. 1. In another embodiment, photographs, images, and other media may also be transmitted to web server 106 from devices 103, 104, and 108. For example, users may send a personal picture that may be used as a background in a captured image in booth 201 during a photo session. User information may be retrieved by booth PC 203 from web server 106 over network 205 in real-time as user information is stored in database 107. In yet another embodiment, mobile client devices 103, 104 and client device 108 may transmit user information directly to booth PC 203 or to web server 106.

An activation command may be forwarded by booth PC 203 or kiosk PC 210 causing activation and screening of a video consisting of a virtual photographer on the display screen 206. A capture command may be forwarded by booth PC 203 or kiosk PC 210 causing activation of camera 202 either simultaneously with the screening of the video or momentarily after the screening of the video. Camera 202 is coordinated to the video being screened on the display screen 206 such that as the virtual video photographer prompts the user into poses, the camera 202 captures an image of the user in the booth during a photo session and may send the image to booth PC 203 where it may be stored or processed at database 213. After a photo session has ended, images may be transmitted over network 205 to web server 106.

In one embodiment, printer 214 may be connected to booth PC 203 for printing images at the end of a photo session. Printing images may include paying a fee or surcharge in exchange for a print copy of the images. Payment may be provided by payment methods such as cash or credit card to payment acceptor 215. Payment acceptor 215 may include circuitry operable to accept coins, bills, credit cards, or other forms of payments, such as a Universal Serial Bus ("USB") circuit board connected to kiosk PC 210. In one embodiment, payment of a predetermined amount of credits may be required before beginning a photo session. Payment acceptor 215 may send signals associated with the amount of credits needed to start the photo session to kiosk PC 210. Once the required amount of credits has been provided, booth pc 203 may initiated to begin capturing images and virtual photographer functions.

In another embodiment, payment may be provided by a user "online" through a website provided by web server 106 or by online payment services such as PayPal. In an alternative embodiment, kiosk PC may include a media dispenser (not illustrated) for providing images to users on a computer readable medium instead of or in addition to printing images. In another embodiment, kiosk PC may also include one or more connector ports, such as USB and FireWire for transfer of the images in a photo session to a user's media storage or portable media device. Tech PC 208 may be communicatively coupled to booth PC for providing troubleshooting, maintenance, or customization. Controller 211 may be communicatively coupled to booth PC 203 for controlling LED lights 209 and blower fan 212. In one embodiment, booth PC 203 or kiosk PC 210 may comprise one or more virtual photographer logic operable to control various components in booth 201, such as camera 202, display screen 206 and LED lights 209 during a photo session.

Figure 3:
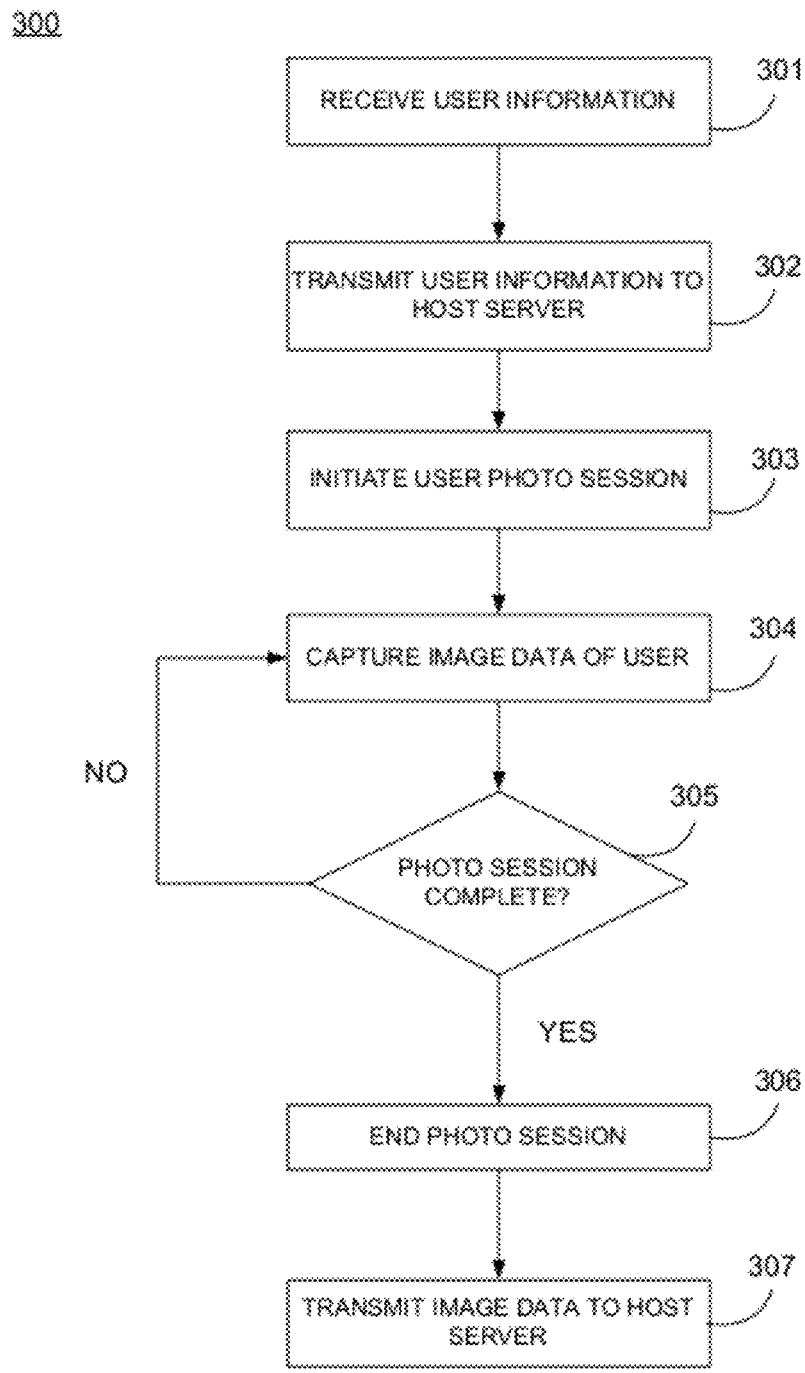
FIG. 3 illustrates a flowchart of a method for capturing image data according to an embodiment of the present invention.

FIG. 3. presents a flowchart of a method 300 for capturing image data according to an embodiment of the present invention. The method of FIG. 3 may be executed in the system of FIG. 2 or any suitable computing environment. User information may be received, step 301. User information may include a user's name, password, address, phone number, e-mail account, web service accounts, and user preferences. In this particular embodiment, the user information may be received via a given booth 101 or 102 using kiosk PC 210 and touch screen 204. The received user information may be stored locally on database 213 and transmitted to the web server 106 if a connection to network 205 exists, step 302.

In an alternative embodiment, a user may enter the user information into mobile client computing devices 103, 104 or client device 108 and transmit the information to booth 201 or web server 106 via mobile client computing devices 103, 104 or client device 108. As user information is transmitted to the web server 106 and stored on database 107, any booth in the system without the received user information, may retrieve, in real-time, the missing user information. The user may initiate a photo session, step 303 in either the same booth or in any other booth that has retrieved the received user information from the database 107. Initiation of the photo session may require identification or authorization of the user requesting the photo session. The identification or authorization may include verifying credentials associated with a given user's user information.

In one embodiment, a session may begin with a selection of a virtual photographer among a choice of various virtual photographers. A given virtual photographer may include playback of a predetermined video corresponding to a theme and prompt the user to pose, smile, or other actions in synchronization with the playback of the video. Virtual photographers may also include on-screen virtual characters that lead users through a photo session. These characters may be predetermined based on a virtual photographer selected, or users may choose or create custom characters to appear in a virtual photographer program. During the photo session, image data of the user may be captured at the booth, step 304.

The virtual photographer may perform automated capturing of user image data upon prompting the user to perform the various actions. Images may correspond to pictures, slideshows, clips, movies and other types of multimedia content. In one embodiment, images captured at the booth may be customized or edited at the booth during the photo session. A determination may be made whether the photo session is complete, step 305. The photo session may be ended upon determination that photo session is complete, step 306. Otherwise, the booth continues to capture image data, step 304.

In a preferred embodiment, ending a photo session includes removing the user information associated with the user of the photo session from all booths. In another embodiment, images captured during the photo session may be printed using printer 214 at the end of the photo session. Images captured during the photo session may be transmitted to web server 106 after ending the photo session, step 307. In a preferred embodiment, the user information is associated with the images and transmitted to the web server 106 where the images may be accessible to a user associated with the user information for subsequent retrieval and customizations. To retrieve the images, the user may logon to web server 106 and verify user information associated with the images. Upon user information verification, the user may download the images, send them to email address, or post them to third party services such as social networking sites.

Figure 4:
FIG. 4 and FIG. 5 illustrate exemplary image data generated according to an embodiment of the present invention.
Figure 5:
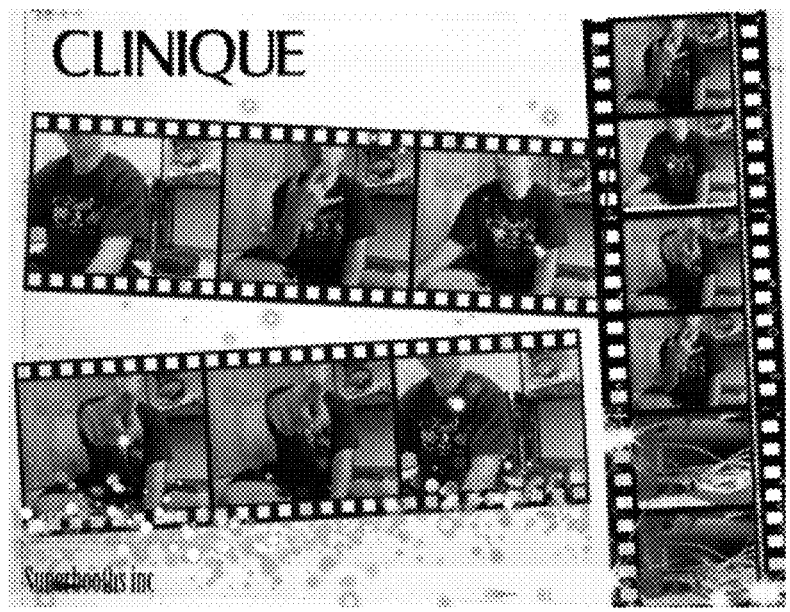

FIG. 4 and FIG. 5 illustrate exemplary customized captured images. Captured images may be personalized or "branded" for specific events or marketing campaigns. The captured images stored on database 107 may be edited, downloaded or purchased from host services provided by web server 106. In one embodiment, captured images hosted by web server 106 may be transmitted to e-mail accounts, social networking sites and to mobile client computing devices 103 and 104.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A system for capturing images in a booth, the system comprising:
   a booth communicatively coupled to a server over the network, the booth comprising:
   an input device operable to receive one or more inputs from a user;
   a camera operable to capture one or more images of the user;
   a display operable to present the one or more images;
   a booth computer operable to transmit the one or more images to the server for storage in a database, and wherein the booth is operable to allow the user to select from among a plurality of virtual photographers, each virtual photographer comprising playback of a predetermined video including an on-screen virtual character designed to lead the user through a photo session including by suggesting actions, gestures or poses to be performed by the user while the one or more images are being captured;
   the booth computer further configured to receive an instruction from the user to generate posts on a content sharing web site using the one or more images.

2. The system of claim 1 wherein the server is operable to allow retrieval of the one or more images by the user.

3. The system of claim 1 wherein the server is operable to allow retrieval of the one or more images by the user on one or more client devices.

4. The system of claim 1 wherein the booth computer is operable to store user information associated with the user.

5. The system of claim 4 wherein the one or more images are associated with the user information.

6. The system of claim 5 wherein the server is operable to allow retrieval of the one or more images upon verification of the user information associated with user.

7. The system of claim 4 wherein the user information includes at least one of the user's name, password, address, phone number, e-mail account, web service accounts and user preferences.

8. The system of claim 4 wherein the server is operable to store the user information associated with the user from the booth computer.

9. The system of claim 4 wherein the server is operable to receive a selection of the booth by a user-operated client device.

10. The system of claim 9 wherein the server is operable to transmit the user information associated with the user to the booth computer upon receiving the selection of the booth by the user.

11. The system of claim 1 wherein the server is further operable to deliver the one or more images to one or more contacts of the user.

12. The system of claim 1 wherein the server is further operable to deliver the one or more images to one or more instant messenger buddies.

13. The system of claim 1 wherein the server is further operable to deliver the one or more images to one or more social networking sites.

14. The system of claim 1 wherein the one or more images are customizable based on one or more photo editing options provided by the booth computer configurable for selection by the user.

15. The system of claim 14 wherein the one or more photo editing options include at least one of adding backgrounds, adding effects, adding text, cropping, re-sizing, red-eye correction, and color correction.

16. The system of claim 14 wherein customizing the one or more images includes branding the one or more images.

17. The system of claim 1 wherein the booth is credit-operated.

18. A system for capturing images in a booth, the system comprising:
- a server communicatively coupled to a network, the server comprising a database operable to store images;
- a booth communicatively coupled to the server over the network, the booth comprising:
  - an input device operable to receive one or more inputs from a user;
  - a camera operable to capture one or more images of the user;
  - a display operable to present the one or more images and a virtual photographer, the virtual photographer includes one or more virtual characters along with at least one of videos, images, animations, graphics, and text that lead the user through a photo session including by suggesting actions, gestures or poses to be performed by the user while the one or more images are being captured; and
  - a booth computer operable to transmit the one or more images to the server.

19. A system for capturing images in a booth, the system comprising:
- a server communicatively coupled to a network, the server comprising a database operable to store images;
- a booth communicatively coupled to the server over the network, the booth comprising:
  - an input device operable to receive one or more inputs from a user;
  - a camera operable to capture one or more images of the user;
  - a display operable to present the one or more images; and
  - a booth computer operable to store user information that is associated with the user and the one or more images, transmit the one or more images to the server, and allow the user to select from among a plurality of virtual photographers, each virtual photographer comprising playback of a predetermined video including an on-screen virtual character designed to lead the user through a photo session including by suggesting actions, gestures or poses to be performed by the user while the one or more images are being captured;
- the server configured to store the user information associated with the user, allow retrieval of the one or more images upon verification of the user information associated with user, and transmit the user information associated with the user to the booth computer upon receiving a selection of the booth by the user from a user-operated client device.

20. The system of claim 19 wherein the server is configured to establish a connection to a content sharing website in response to an instruction received from the user to generate posts on the content sharing website using the one or more images, and transmit the one or more images to the content sharing website.

* * * * *